Aug. 9, 1932.  D. P. DAVIES  1,871,306
POWER TRANSMISSION FOR AGRICULTURAL MACHINES
Filed April 28, 1930
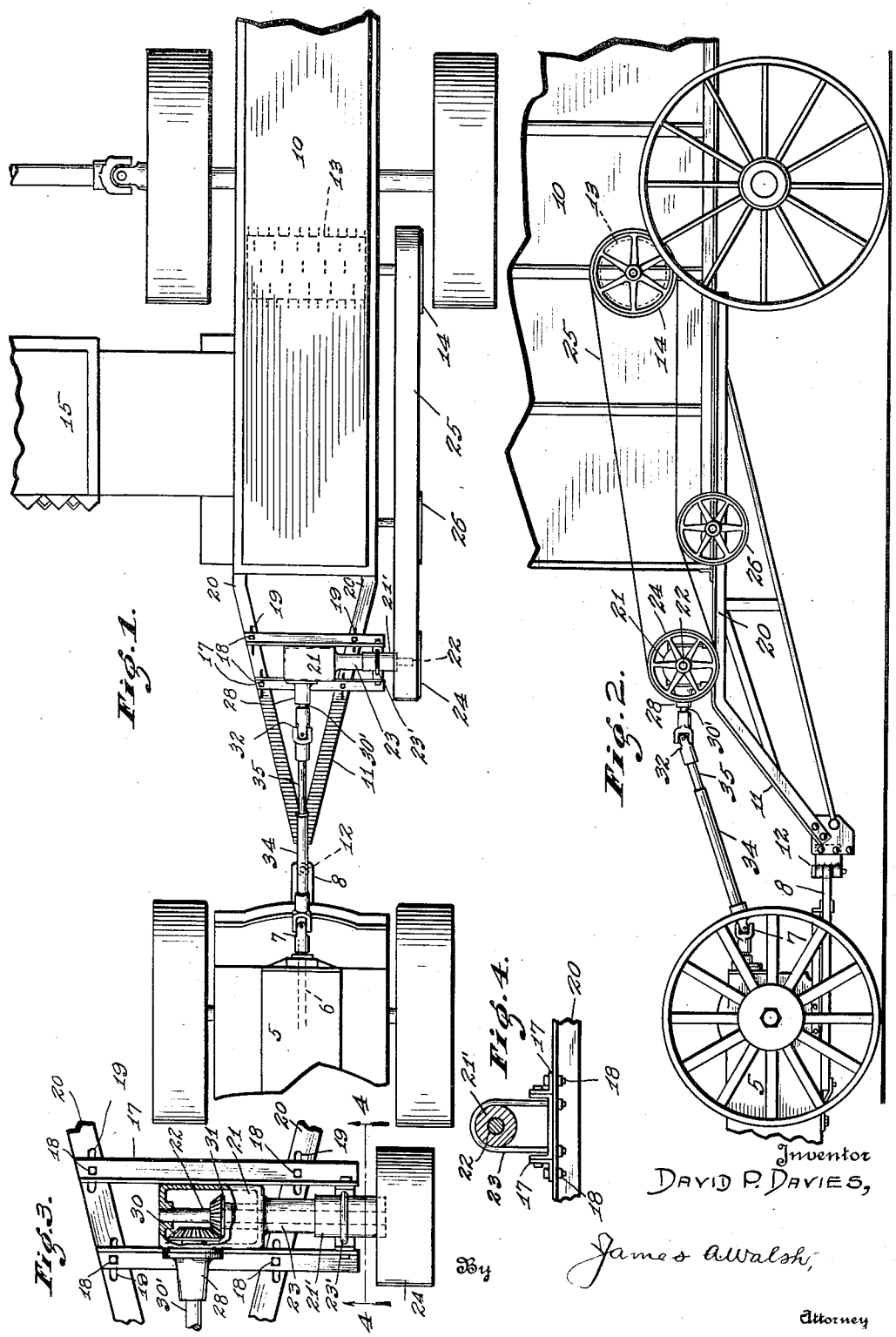
Inventor
DAVID P. DAVIES,
By James A Walsh,
Attorney Patented Aug. 9, 1932

1,871,306

UNITED STATES PATENT OFFICE

DAVID P. DAVIES, OF RACINE, WISCONSIN, ASSIGNOR TO J. I. CASE COMPANY, OF RACINE, WISCONSIN, A CORPORATION

POWER TRANSMISSION FOR AGRICULTURAL MACHINES

Application filed April 28, 1930. Serial No. 447,990.

My invention relates to improved power transmission particularly adapted for use in connection with a tractor and an agricultural machine, for example, a harvester-thrasher which is drawn through the fields by the tractor and which latter at the same time actuates the operating mechanisms thereof; and it is the object of my invention to provide a cushioning or shock-absorbing connection between a tractor power take-off shaft and a thrasher cylinder or other rotary element of the same or other machine, whereby when power is suddenly applied to or such parts become abruptly stopped, or slowed up from choking when foreign matter is accidentally introduced, relief from damage or breakage is provided by my improved driving means, as will further appear.

In the accompanying drawing, forming part hereof, I have illustrated a combination harvester-thrasher and a tractor to show the application of my improved power transmission, Figure 1 being a plan view of the thrasher with the header and tractor shown in fragment; Fig. 2 is a side elevation of the thrasher and tractor indicating the application of my improved drive; Fig. 3, a detail of the gear housing and associated parts; and Fig. 4 is a detail taken on the dotted line 4—4 in Fig. 3.

In said drawing the numeral 5 indicates a tractor having a rearwardly extending power take-off shaft 6 to which a universal joint 7 is secured, the tractor being provided with a draw-bar 8 as usual. A thrasher or other machine 10 is connected by its draw-bar 11 to the tractor draw-bar 8 by means of a suitable coupling, as 12, said thrasher, as usual, being provided with a cylinder 13 upon the shaft of which a pulley 14 is mounted, and which machine is shown connected to a header 15 in a desired manner. The parts thus described may be of any desired or well known construction and arrangement and will be referred to but incidentally in describing my improved power transmission.

Upon the thrasher 10 a suitable platform, or supports, 17, are secured by bolts 18, which latter are engaged in slots 19 in the frame members 20 so that the supports 17 may be adjusted for a purpose to further appear. Upon said supports a gear casing 21 is secured, and in which is a shaft 22 which extends outwardly through a bearing neck 23' of the casing, the neck being held to the supports 17 by a U-bolt 23' passing about the sleeve 21' or otherwise, the shaft carrying a pulley 24 which is connected to pulley 14 by a belt 25 held in taut condition by a tightener pulley 26, and variations in the belt may be further compensated for by adjusting the gear casing 21 through bolts 18 and the slots 19 above described.

In bearing 28, preferably forming an integral part of the gear casing 21, I mount bevel gear 30, Fig. 3, which meshes with a similar gear 31 on shaft 22, and to the shaft 30' of gear 30 a universal joint 32 is secured and to which joint and the universal joint 7 is attached a telescoping shaft 34, 35, which drives the belt 25 through said gears 30 and 31.

I am aware that the actuating mechanisms of field machines are driven from the power take-off shaft of a tractor and that it has been the practice to directly rotate the cylinder shaft of a thrasher through bevel gears driven by a universally jointed shaft from such power take-off, requiring complicated slip clutches, numerous bearings, supports and other equipment. It is well known that field machine parts so driven are subject to much damage and breakage through the sudden application of power, abrupt stopping, and choking or slugging by the introduction of bulky or irregularly massed material, or foreign substances accidentally introduced, which difficulties are obviated by my improved transmission drive. It will be understood that the universally jointed shaft 34—35 will at all times respond to the variable movements of the tractor and the drawn machine and continue driving action of the gears 30, 31, to rotate pulleys 24 and 14 and in turn the rotary element, as 13, through the belt connection, which belt functions as a shock absorber or cushioning medium during the driving action, for the reason that should the driven rotary element be abruptly stopped or started as indicated the belt will either slip about the pulleys or be thrown therefrom, so that said belt will remain idle, and also that there will be no undue strain on the parts directly associated with the universally jointed drive shaft and which parts will run idly until the belt takes up its load or the pulleys have been re-belted, according to circumstances. Therefore, the belt being self-acting in the manner stated provides relief from breakage or damage by minimizing and absorbing the shocks incident to the contingencies referred to, and by the use of which I am enabled to eliminate many parts commonly required when driving directly from a tractor power shaft to a cylinder and the like through bevel gears in the manner hereinbefore referred to.

I claim as my invention:

The combination, with a harvester-thrasher, of a gear housing, an adjustable support for the housing whereby the latter may be shifted in relation to the thrasher, a shaft in the housing, gearing for rotating the shaft, a universal joint connected to the gearing, an extensible shaft connected to the universal joint, a universal joint at the opposite end of the shaft and connected to a tractor power shaft whereby said geared shaft is rotated, and a belt connected to and driven by said geared shaft for actuating rotary elements of the thrasher.

In testimony whereof I affix my signature.

DAVID P. DAVIES.